(12) United States Patent
Choi

(10) Patent No.: US 11,739,949 B2
(45) Date of Patent: *Aug. 29, 2023

(54) STEAM GENERATOR AND COOKING APPLIANCE

(71) Applicant: LG ELECTRONICS INC., Seoul (KR)

(72) Inventor: Sungho Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 324 days.

This patent is subject to a terminal disclaimer.

(21) Appl. No.: 17/063,854

(22) Filed: Oct. 6, 2020

(65) Prior Publication Data
US 2021/0018183 A1 Jan. 21, 2021

Related U.S. Application Data

(63) Continuation of application No. 15/921,824, filed on Mar. 15, 2018, now Pat. No. 10,830,456, which is a
(Continued)

(30) Foreign Application Priority Data

Sep. 27, 2013 (KR) .......................... 10-2013-0114895
Sep. 27, 2013 (KR) .......................... 10-2013-0114901

(51) Int. Cl.
*F22B 1/28* (2006.01)
*A47J 27/04* (2006.01)
(Continued)

(52) U.S. Cl.
CPC ............. *F24C 15/327* (2013.01); *A47J 27/04* (2013.01); *F22B 1/282* (2013.01); *F22B 1/284* (2013.01);
(Continued)

(58) Field of Classification Search
None
See application file for complete search history.

(56) References Cited

U.S. PATENT DOCUMENTS 4,990,745 A * 2/1991 Bayles .................... D06F 75/18
392/386
5,265,318 A * 11/1993 Shero .................... B23P 11/025
392/491
(Continued)

FOREIGN PATENT DOCUMENTS

CN      102188154      9/2011
EP      2 417 881      2/2012
(Continued)

OTHER PUBLICATIONS

U.S. Office Action issued in U.S. Appl. No. 14/499,448 dated Jul. 27, 2017.
(Continued)

*Primary Examiner* — Joseph M. Pelham
(74) *Attorney, Agent, or Firm* — Ked & Associates

(57) ABSTRACT

A steam generator is provided. The steam generator may include a steam chamber, a steam heater to supply heat into the steam chamber, a water supply, through which water to generate steam may be supplied into the steam chamber, one or more interference members disposed in the steam chamber to interfere with a flow of the water introduced through the water supply, and at least one discharge to discharge the steam generated in the steam chamber. The one or more interference members may be disposed under the at least one discharge and above the water supply.

10 Claims, 18 Drawing Sheets

Related U.S. Application Data continuation of application No. 14/499,448, filed on Sep. 29, 2014, now Pat. No. 10,047,961.

(51) Int. Cl.
| | |
|---|---|
| *A47J 27/16* | (2006.01) |
| *F24C 7/00* | (2006.01) |
| *F24C 13/00* | (2006.01) |
| *F24C 15/00* | (2006.01) |
| *F24C 15/32* | (2006.01) |

(52) U.S. Cl.
CPC ....... *A47J 2027/043* (2013.01); *F24C 15/006* (2013.01)

(56) References Cited

U.S. PATENT DOCUMENTS

| | | | | |
|---|---|---|---|---|
| 5,869,812 | A * | 2/1999 | Creamer | F24C 15/327 |
| | | | | 219/401 |
| 5,949,958 | A * | 9/1999 | Naperkowski | F22B 1/288 |
| | | | | 392/399 |
| 6,299,076 | B1 * | 10/2001 | Sloan | F22B 1/285 |
| | | | | 392/399 |
| 7,577,343 | B2 * | 8/2009 | Chiang | F22B 1/284 |
| | | | | 99/468 |
| 7,989,737 | B2 * | 8/2011 | Jeon | F22B 1/288 |
| | | | | 219/401 |
| 8,554,063 | B2 * | 10/2013 | Hsu | F22B 1/28 |
| | | | | 392/394 |
| 9,903,597 | B2 * | 2/2018 | Nishijima | F01K 23/00 |
| 2008/0075822 | A1 * | 3/2008 | Jeon | H05B 6/6479 |
| | | | | 122/491 |
| 2009/0151400 | A1 * | 6/2009 | Park | D06F 39/008 |
| | | | | 337/407 |
| 2011/0095013 | A1 * | 4/2011 | Utsumi | F22G 1/16 |
| | | | | 219/520 |
| 2013/0042768 | A1 * | 2/2013 | Nishijima | A21B 3/04 |
| | | | | 99/410 |
| 2015/0090706 | A1 * | 4/2015 | Choi | F22B 1/284 |
| | | | | 392/398 |
| 2016/0150906 | A1 * | 6/2016 | Lee | F24C 15/003 |
| | | | | 392/401 |
| 2019/0309956 | A1 * | 10/2019 | Buschman | F24C 13/00 |
| 2019/0316783 | A1 * | 10/2019 | Lee | F24C 15/2007 |
| 2020/0011537 | A1 * | 1/2020 | Yoon | F22B 1/284 |

FOREIGN PATENT DOCUMENTS

| | | |
|---|---|---|
| EP | 2 418 432 | 2/2012 |
| JP | 2006-23078 | 1/2006 |
| JP | 2011-179792 | 9/2011 |
| KR | 20-0420244 | 6/2006 |
| KR | 20-0425391 | 8/2006 |
| KR | 10-2010-0111201 | 10/2010 |
| KR | 10-2010-0112966 | 10/2010 |
| KR | 10-2010-0112967 | 10/2010 |
| KR | 10-2011-0019757 | 2/2011 |
| KR | 10-2011-0082794 | 7/2011 |
| KR | 20110109661 A * | 10/2011 |

OTHER PUBLICATIONS

U.S. Final Office Action issued in U.S. Appl. No. 14/499,448 dated Dec. 26, 2017.
Korean Office Action dated May 29, 2019 (10-2013-0114895).
Korean Office Action dated May 29, 2019 (10-2013-0114901).
U.S. Office Action issued in U.S. Appl. No. 15/921,824 dated Jan. 27, 2020.
Korean Notice of Allowance dated Apr. 20, 2020 (10-2013-0114895).
Korean Notice of Allowance dated Apr. 20, 2020 (10-2013-0114901).
U.S. Notice of Allowance issued in U.S. Appl. No. 15/921,824 dated Jun. 23, 2020.

* cited by examiner

STEAM GENERATOR AND COOKING APPLIANCE

CROSS-REFERENCE TO RELATED APPLICATIONS

This application is a Continuation Application of prior U.S. patent application Ser. No. 15/921,824 filed Mar. 15, 2018, which is a Continuation Application of prior U.S. patent application Ser. No. 14/499,448 filed Sep. 29, 2014, now U.S. Pat. No. 10,047,961, which claims priority under 35 U.S.C. § 119 to Korean Patent Application Nos. 10-2013-0114895, and 10-2013-0114901, filed in Korea on Sep. 27, 2013, whose entire disclosures are hereby incorporated by reference.

BACKGROUND

1. Field

A steam generator and a cooking appliance are disclosed herein.

2. Background

Cooking appliances are a kind of kitchen equipment that heats and cooks food or other items to change a state thereof. Such a cooking appliance may be classified into an electric cooking appliance and a gas cooking appliance according to a kind of heating source.

A heater to generate heat using supplied electricity as a heating source may be mounted on the electric cooking appliance. Also, a burner to generate heat by producing combustion of a supplied gas to generate a flame may be mounted on the gas cooking appliance.

Cooking appliances may be classified into an oven type cooking appliance that heats food in a state in which the food is received into a cooking chamber that provides a space in which the food is cooked, and a range type cooking appliance that heats a container, in which food is contained, in an open space according to a shape thereof. In recent years, multifunctional cooking appliances, which are capable of cooking various food and satisfying user's tastes, that is, an oven range type cooking appliances in which the oven type cooking appliance and the range type cooking appliance are combined, have been developed.

Various types of heating sources to heat food may be mounted on the cooking appliances. Such a heating source may include a magnetron to irradiate microwaves onto food to heat the food, a heater to convert electric energy into heat energy to heat received food, or a burner to produce combustion of a supplied gas to generate a flame, thereby heating the food.

Also, cooking appliances on which at least two heating sources are mounted to cook various food are being provided. For example, the magnetron and the heater may be mounted as the heating sources, or the heater and the burner may be mounted as the heating sources.

In addition, cooking appliances to generate steam to cook various food, reduce a cooking time, and clean a cooking space are being released. That is, the cooking appliances may perform functions in which food is heated using steam, food is dried using steam, or a cooking space is cleaned using steam. However, if water boils over, and thus, is introduced into the cooking space, the cooking space has to be cleaned to prevent the cooking space from being contaminated.

Korean Patent Publication No. 10-2010-0112966 discloses a steam generator and a cooking appliance including the same, and more particularly, a steam generator that generates steam to more efficiently cook food using the generated steam and a cooking appliance including the same. The steam generator includes a heating space in which water is stored, a water supply part, through which the water stored in the heating space is supplied, defined above a maximum water level of the water stored in the heating space, a steam discharge part, through which steam generated by heating the water stored in the heating space is discharged, defined above the water supply part, and one steam heater to heat the water stored in the heating space to generate the steam. As disclosed in Korean Patent Publication No. 10-2010-0112966, the steam function to supplement moisture evaporated while food is cooked and/or supply steam into the food to cook the food using high-temperature steam may be provided for efficiently cooking the food.

As described above, steam may be an important factor in cooking food. That is, the steam may be an issue of importance in improving satisfaction in a state of cooked food, cleaning of a cooking space, and prevention of contamination, and reduction of cooking time.

BRIEF DESCRIPTION OF THE DRAWINGS

Embodiments will be described in detail with reference to the following drawings in which like reference numerals refer to like elements, and wherein.

DETAILED DESCRIPTION

Figure 1:
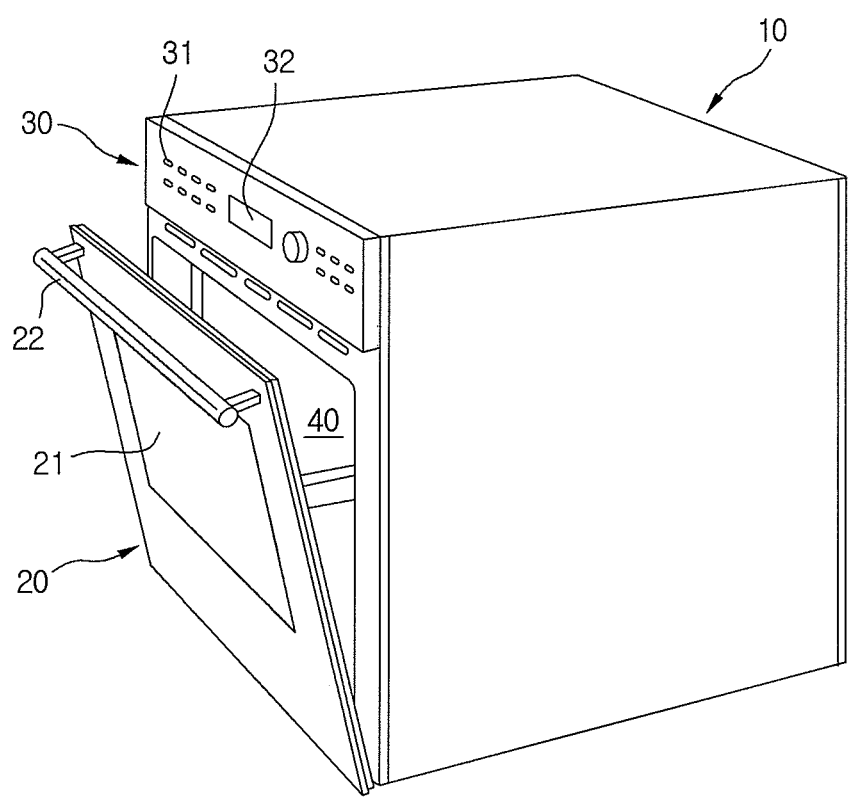
FIG. 1 is a perspective view of a cooking appliance according to an embodiment.

Reference will now be made in detail to the embodiments disclosure, examples of which are illustrated in the accompanying drawings. Where possible, like reference numerals have been used to indicate like elements, and repetitive disclosure has been omitted.

In the following detailed description of embodiments, reference is made to the accompanying drawings that form a part hereof, and in which is shown by way of illustration specific embodiments. These embodiments are described in sufficient detail to enable those skilled in the art to practice the embodiments, and it is understood that other embodiments may be utilized and that logical structural, mechanical, electrical, and chemical changes may be made without departing from the spirit or scope. To avoid detail not necessary to enable those skilled in the art to practice the embodiments, the description may omit certain information known to those skilled in the art. The following detailed description is, therefore, not to be taken in a limiting sense.

Figure 2:
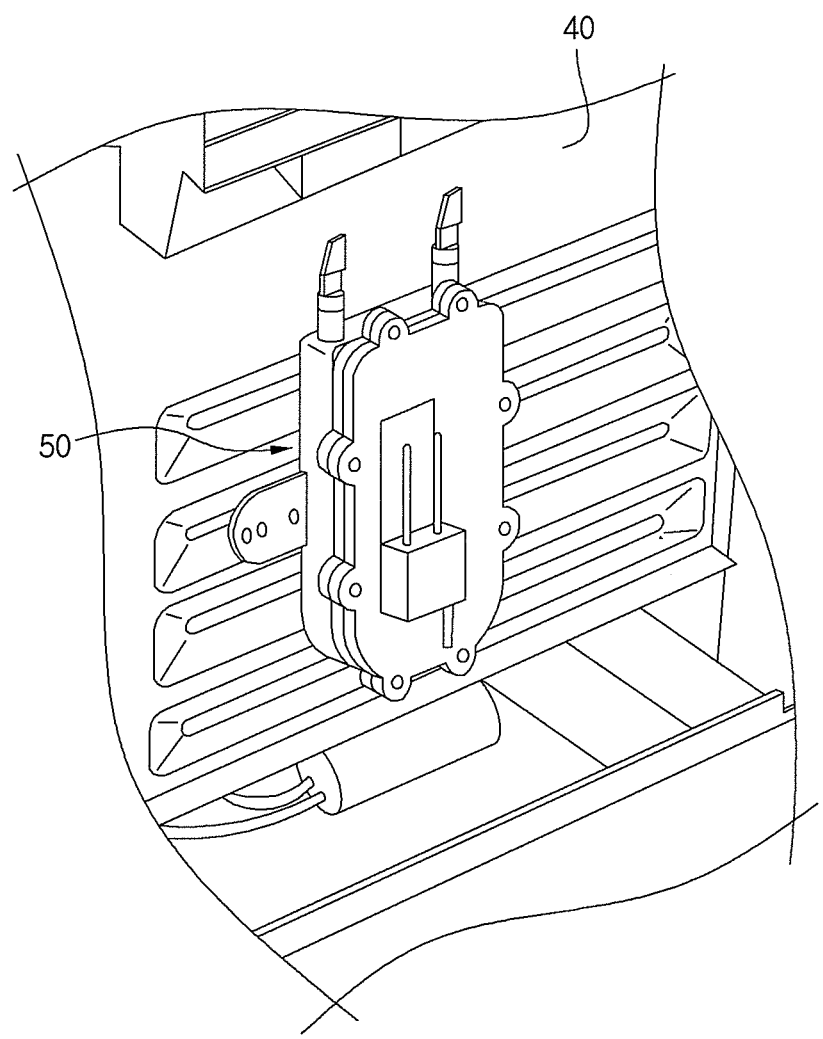
FIG. 2 is a partial enlarged perspective view of the cooking appliance of FIG. 1.

FIG. 1 is a perspective view of a cooking appliance according to an embodiment. FIG. 2 is a partial enlarged perspective view of the cooking appliance of FIG. 1.

Referring to FIGS. 1 and 2, a cooking appliance may have an exterior having a predetermined inner space and a generally rectangular parallelepiped box shape. Of course, the cooking appliance may have a globular shape. However, in terms of safety and functionality, the cooking appliance may generally have the exterior having the rectangular parallelepiped shape.

The cooking appliance may include a case 10 that defines the exterior thereof, a door 20 that selectively opens or closes a front surface of the case 10, and a display 30 disposed on a side of the door 20 to allow direct manipulate of an operation of the cooking appliance by a user or inform an operation state of the cooking appliance to the user. The case 10 may define an inner space in the form of a plurality of coupled plates, each of which may have a predetermined thickness. Also, the case 10 may be configured to protect a plurality of components mounted in the inner space against an external impact.

In detail, the plurality of plates may include a bottom plate that supports the plurality of components and defines an exterior of a bottom surface, front and rear plates having lower ends coupled to the bottom plate and that define exteriors of front and rear surfaces, and an outer plate that defines exteriors of a top and both side surfaces and having a lower end coupled to the bottom plate.

The door 20 may have a square plate shape having a predetermined thickness. A viewing window 21 to allow a user to see through into the inner space to confirm a cooked state of food or other items may be disposed in a central portion of the door 20.

A door handle 22 graspable by a user when the user intends to rotate the door 20 open may be mounted on an upper portion of a front surface of the door 20. As the door 20 rotates in a state in which the door handle 22 is grasped by the user, a front surface of the case 10 may be selectively opened or closed.

The display 30 may be disposed above the door 20 and define a portion of the front surface of the cooking appliance. The display 30 may include a plurality of buttons 31 to allow the user to directly manipulate the operation of the cooking appliance to cook the food, and a display window 32 to inform the user about an operation state of the cooking appliance.

A cooking chamber 40 to provide a space in which the food or other items may be cooked may be defined in the inner space of the case 10, which may be selectively opened or closed by rotation of the door 20. A plurality of electronic components may be disposed outside of the cooking chamber 40.

For example, a magnetron that emits microwaves into the inner space of the cooking chamber 40, and a heater that emits radiant heat into the inner space of the cooking chamber 40 may be disposed outside of the cooking chamber 40. Of course, a plurality of other electronic components may be disposed together to cook the food placed in the inner space of the cooking chamber 40.

A steam generator 50 to generate steam to be supplied into the inner space of the cooking chamber 40 may be mounted on one surface of the outside of the cooking chamber 40, in particular, in a space different from the space in which the magnetron and the heater are mounted. The steam generator 50 may heat water supplied into an inner space thereof to generate steam. The steam generated in the inner space of the steam generator 50 may be supplied into the inner space of the cooking chamber 40 to heat the food or supply moisture into the food.

Although the steam generator 50 is shown mounted on an outer surface of the cooking chamber 40 in this embodiment, embodiments are not limited thereto. For example, the steam generator 50 may be mounted at any position at which the steam is capable of being supplied into the inner space of the cooking chamber 40. Thus, embodiments are not limited to a specific mounted position of the steam generator 50.

However, if the steam generator 50 is spaced apart from the outer surface of the cooking chamber 40, a separate passage to supply the steam generated by the steam generator 50 into the inner space of the cooking chamber 40 may be necessary. Thus, the steam generator 50 may be in contact with the cooking chamber 40.

Also, a steam tank (not shown), in which water to be supplied into the steam generator 50 may be received, may be mounted on a bottom or side surface of the cooking chamber 40. The steam tank may be formed of a material have superior heat and humidity resistance. The steam tank may be connected to the steam generator 50 to supply the water. When the steam tank is disposed under the steam generator 50, the cooking appliance may further include a separate pump to supply the water into the steam generator 50.

Alternatively, the steam generator 50 may be connected to a water supply without providing the steam tank, to directly supply water into the steam generator 50. However, in this case, a connection member to directly connect the steam generator 50 to the water supply may be exposed to the outside of the case 10 and be connected to the water supply. As a result, to avoid limiting an installation position of the cooking appliance, the cooking appliance may include the steam tank.

Hereinafter, a steam generator of the cooking appliance according to this embodiment will be described in detail with reference to the accompanying drawings.

Figure 3:
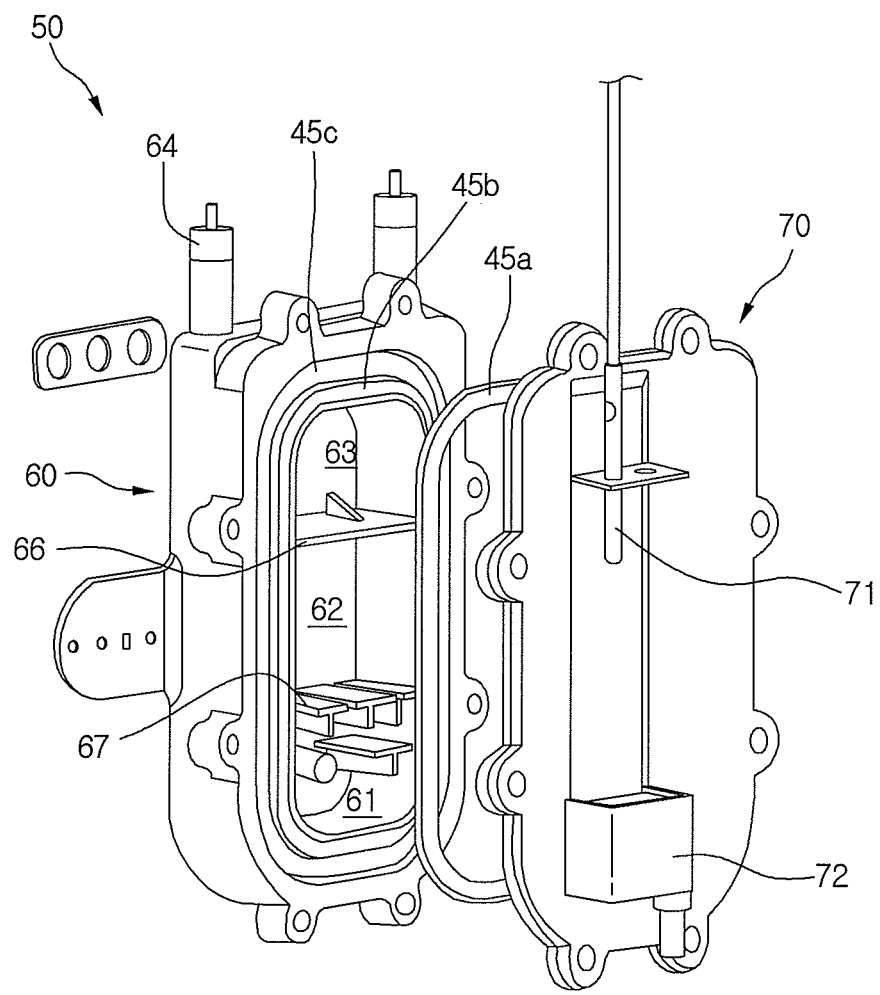
FIGS. 3 and 4 are perspective views of a steam generator of the cooking appliance of FIG. 1 according to an embodiment.
Figure 4:
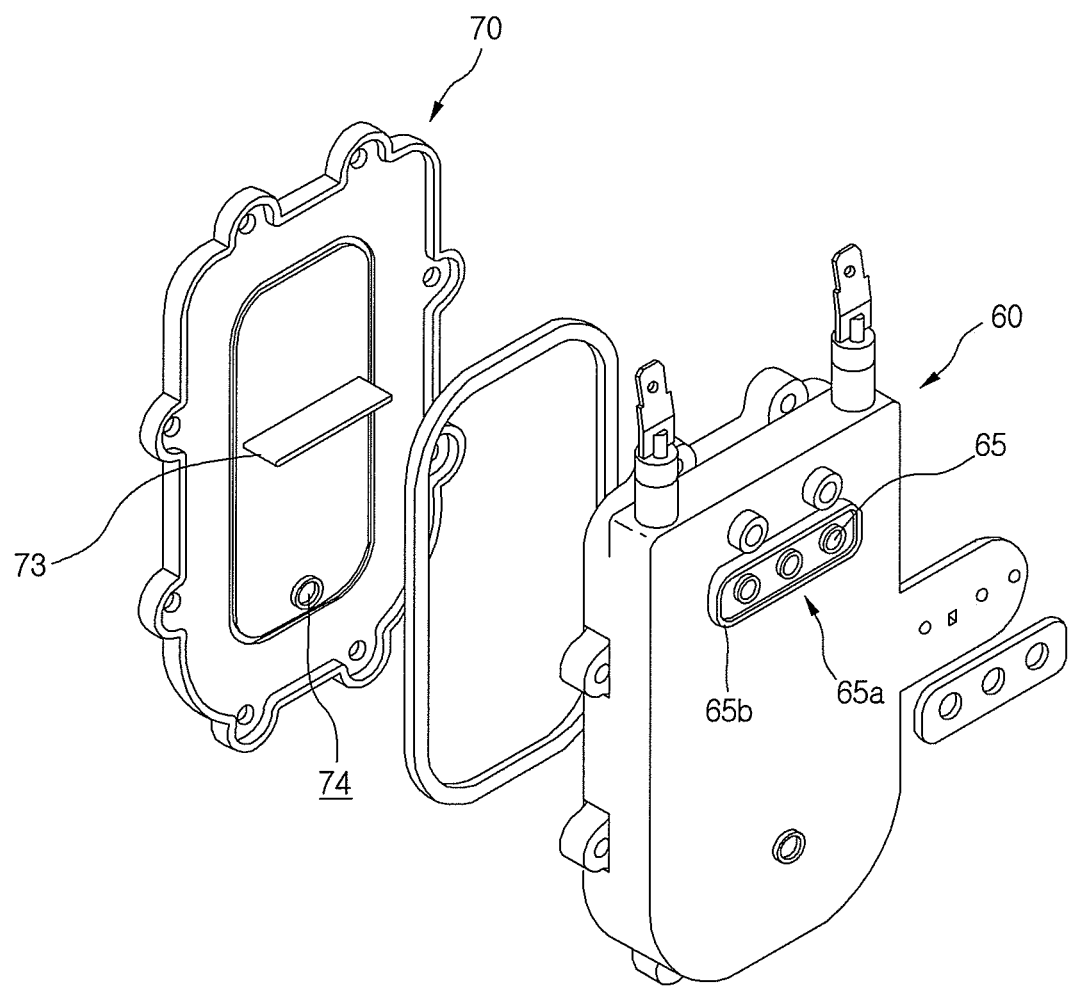
Figure 5:
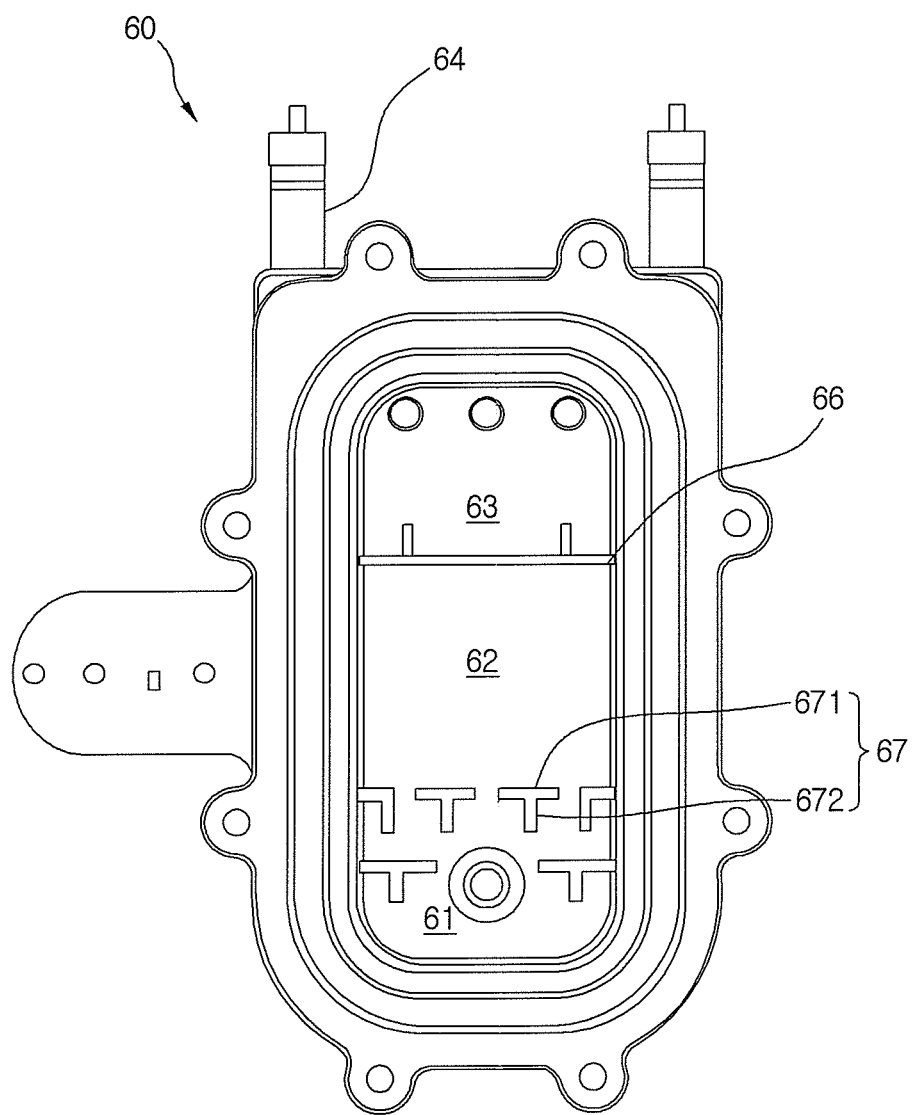
FIG. 5 is a front view of a steam case of the cooking appliance of FIG. 1.
Figure 6:
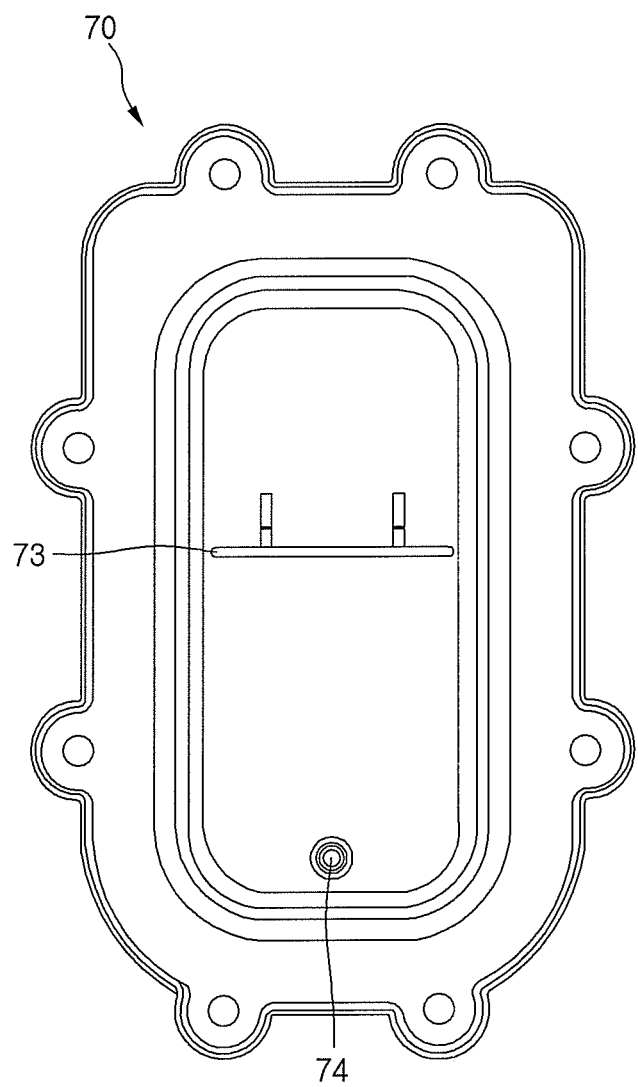
FIG. 6 is a rear view of a steam cover of the cooking appliance of FIG. 1.
Figure 7:
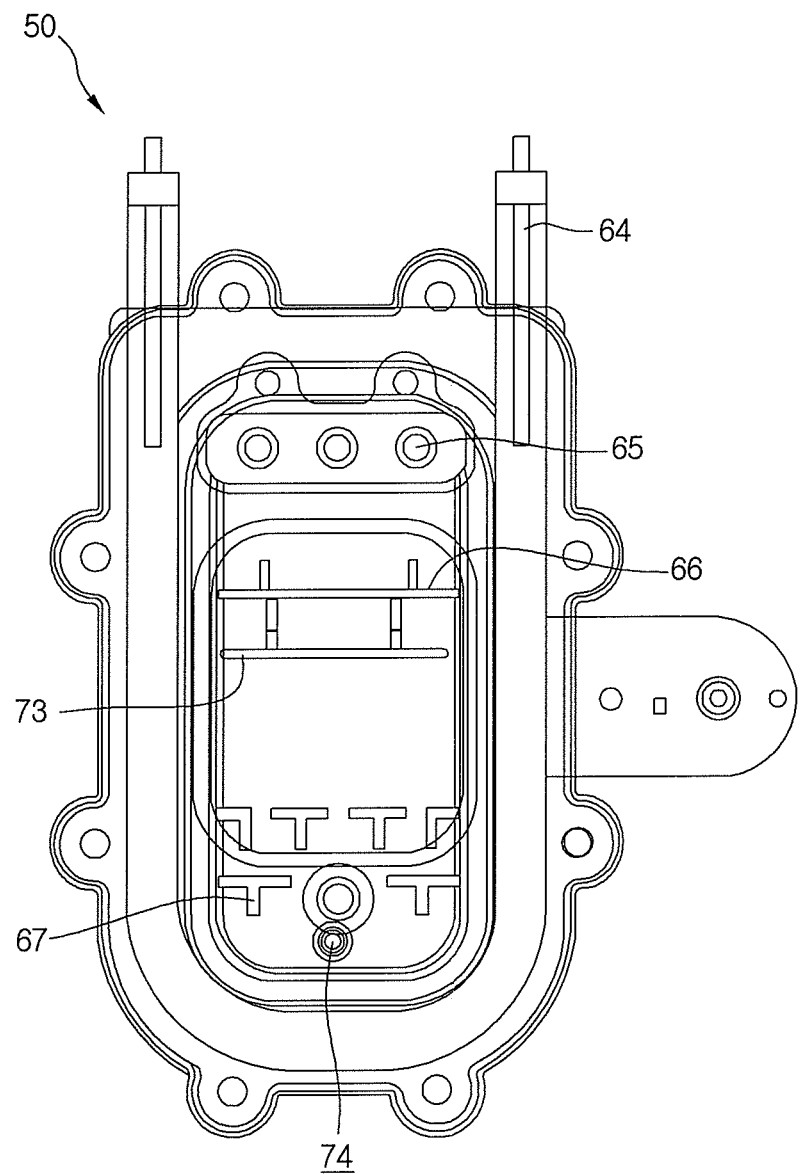
FIG. 7 is a front view of the steam generator of the cooking appliance of FIG. 1.

FIGS. 3 and 4 are perspective views of a steam generator of the cooking appliance according to this embodiment. FIG. 5 is a front view of a steam case according to this embodiment. FIG. 6 is a rear view of a steam cover according to this embodiment. FIG. 7 is a front view of the steam generator according to this embodiment.

Referring to FIGS. 3 to 7, the steam generator 50 may include a steam case 60 having an inner space in which steam may be generated, and a steam cover 70 coupled to the steam case 60 to cover the inner space of the steam case 60. The inner space defined by coupling the steam case 60 to the steam cover 70 may be referred to as the steam generator 50.

In this embodiment, the inner space to generate the steam, which is defined by coupling the steam case 60 to the steam cover 70, may be referred to as a steam chamber.

A packing member 45a to prevent water received in the inner space of the steam case 60 from leaking may be further disposed between the steam case 60 and the steam cover 70. The packing member 45a may be mounted along an edge 45b of an open surface of the steam case 60, or may be inserted between the steam case 60 and the steam cover 70 in a state in which the packing member is seated into a packing member groove 45c defined along the edge 45b of the open surface of the steam case 60 to prevent the water from leaking from the inner space of the steam case 60 outside thereof.

The steam case 60 may have a polyhedral shape having a horizontal length greater than a vertical length thereof. The steam case 60 may have an one open surface, and the steam cover 70 may be coupled to the one open surface to cover the one open surface of the steam case 60. That is, as the stream cover 70 may be coupled to the one open surface of the steam case 60, the steam chamber may be defined between the steam case 60 and the steam cover 70.

Of course, embodiments are not limited to a particular shape of the steam case 60. For example, the steam case 60 may have any shape if the steam case 60 is capable of being coupled to the steam cover 70 to define the inner space.

Further, embodiments are not limited to the shape or size of the steam case 60. However, the steam case 60 may have the inner space having a vertical cross-sectional area greater than a horizontal cross-sectional area thereof. This is done to improve re-heating efficiency of the steam generated in the inner space by a steam heater 64, which will be described hereinbelow.

The steam chamber within the steam generator 50 may be divided into at least two spaces. The two spaces may include a first space 61, in which the water to generate the steam may be received and heated, and a second space 62, in which the water heated in the first space 61 may change into a steam state. The steam chamber within the steam generator 50 may further include a third space 63, in which the saturated steam within the second space 62 may be heated to change into superheated steam.

In detail, the first space 61 may be defined in or at a lower side of the inner space of the steam case 60, and the second space 62 may be defined above the first space 61. Also, the third space 63 may be defined above the second space 62.

That is, the steam may be generated while the water is heated in the first space 61, and the generated steam may flow upward into the second space 62 defined above the first space 61. The steam flowing into the second space 62 may be continuously heated while flowing upward, and the heated steam may flow into the third space 63 defined above the second space 62.

The steam flowing into the second space 62 may flow in the form of saturated steam generated while the water is heated. The steam flowing into the third space 63 while the saturated steam is continuously heated may be further heated to flow in the form of superheated steam.

As described above, the inner space of the steam case 60 may be divided into at least two spaces. Thus, supplied water may change into high-temperature, superheated steam, and then, may be discharged to supply the steam into the inner space of the cooking chamber 40.

Alternatively, the inner space of the steam case 60 may be divided into the first space 61 and the second space 62, and the steam may be continuously heated along the flow direction of the steam while the steam is generated in the first space 61. However, to generate the superheated steam, the steam case 60 may be divided into the three spaces.

The steam heater 64 to heat the water supplied into the inner space may be mounted on the steam case 60. The steam heater 64 may heat the water received in the inner space of the steam case 60 while radiating the heat, using an applied power, and the water may be heated by the heat radiated from the steam heater 64 to phase-change into steam.

The steam heater 64 may convert electric energy into heat energy using the applied power to transfer the converted heat energy into the steam case 60. The transferred heat energy may heat the water and the steam within the inner space of the steam case 60.

When viewed from a lateral side, the steam heater 64 may have a "U" shape and may be mounted on the steam case 60 to heat the water received in the inner space of the steam case 60. Also, as the heat radiated from the steam heater 64 may be transferred into the steam cover 70, and then, may be transferred into the water received in the inner space of the steam generator 50, each of the steam case 60 and the steam cover 70 may be formed of a material having high heat conductivity.

The steam generated while being heated by the steam heater 64 may be supplied into the cooking chamber 40 in a saturated steam state, or the saturated steam may be further heated and then supplied into the cooking chamber 40 in a superheated steam state.

Although not shown, on one side surface of the cooking chamber 40, more particularly, a surface on which the steam generator 50 is provided, a steam groove to provide a passage through which the steam generated in the steam generator 50 may be supplied into the inner space of the cooking chamber 40, may be defined. Thus, the steam generated in the steam generator 50 may be supplied into the inner space of the cooking chamber 40 through the steam groove.

To discharge the steam generated in the inner space of the steam generator 50 into the cooking chamber 40, at least one discharge 65 that communicates with the steam groove defined in the cooking chamber 40 in a state in which the steam case 60 is mounted on the outer surface of the cooking chamber 40 may be defined in the steam case 60. The steam passing through the at least one discharge 65 may be horizontally discharged, and then, may be supplied into the inner space of the cooking chamber 40. The at least one discharge 65 may be defined in an upper portion of the steam case 60 to communicate with the third space 63 defined in the inner space of the steam generator 50.

That is, the at least one discharge 65 may be defined in an upper portion of the outer surface of the steam case 60 that contacts the outer surface of the cooking chamber 40. However, although it is not necessary to provide the at least one discharge 65 defined in the upper portion of the outer surface of the steam case 60, the at least one discharge 65 may be disposed in the upper portion of the outer surface of the steam case 60 so as to discharge the superheated steam introduced into the third space 63 into the cooking chamber 40 through the at least one discharge 65 in a state in which the superheated stream is further heated by the steam heater 64 while flowing upward. For example, the at least one discharge 65 may be defined in an upper portion of a region corresponding to the third space 63.

Also, the at least one discharge 65 may be defined above a water supply 74. This is done to generate steam by heating the water introduced through the water supply 74 and generate the superheated steam by further heating the saturated steam.

A closely attaching member 65a to prevent the steam discharged through the at least one discharge 65 from leaking may further be mounted on one surface of the steam case 60 in which the at least one discharge 65 is defined. In addition, a support rib 65b to support the closely attaching member 65a may be provided. Also, a coupling hole coupled to a fixing member (not shown) to couple the steam case 60 to the outer surface of the cooking chamber 40 may be further defined in one surface of the steam case 60, in which the at least one discharge 60 is defined.

A flow restricter may be disposed in the inner space of the steam generator 50. The flow restricter may restrict a flow of each of the water and steam, which flow into the inner space of the steam generator 50. The flow restricter may include a partition 66 to partition the inner space of the steam generator 50 into the second space 62 and the third space 63. The partition 66 may be formed integral with the steam case 60.

Alternatively, the flow restricter may include a guide 73 disposed on the steam cover 74. Alternatively, the flow restricter may include the partition 66 and the guide 73.

The flow restricter may have a flow passage through which the steam may flow. Thus, the flow restricter may guide the flow of the steam through the flow passage.

Alternatively, when the flow restricter is disposed on the steam case 60 or the steam cover 70, the flow restricter may be spaced apart from the steam cover 70 or the steam case 60 without contacting the steam cover 70 or the steam case 60 to provide space for the flow passage for the steam.

Hereinafter, a flow restricter including partition 66 to partition the inner space into the second space 62 and the third space 63 and the guide 73 to guide the steam within the first space 61 into the second space 62 will be described as an example. In this embodiment, as the guide 73 partitions the inner space into the first space 61 and the second space 62, the guide 73 may also be referred to as a partition.

Partition 66 defining the third space 63 may be disposed in the inner space of the steam case 60. That is, a bottom surface of the third space 63 may be defined by the partition 66. Also, a top surface of the second space 62 may be defined by the partition 66.

In more detail, the partition 66 may have a plate shape having a predetermined thickness to cross the inner space of the steam case 60. The partition 66 may be spaced a predetermined distance from the steam cover 70 to provide a flow passage through which the steam may flow upward from the second space 62.

The guide 73 may be disposed on the steam cover 70 and be accommodated into the steam case 60 in a state in which the steam cover 70 is coupled to the steam case 60 to partition the inner space into the first space 61 and the second space 62. That is, the guide 73 may define a top surface of the first space 61 and a bottom surface of the second space 62. Also, the guide 73 may be spaced apart from a surface of the steam case 60 in a state in which the steam cover 70 is coupled to the steam case 60.

As described above, as the guide 73 is spaced apart from the one surface of the steam case 60, the steam within the first space 61 may flow into the second space 62 through a passage (hereinafter, referred to as a first passage) defined between the guide 73 and the surface of the steam case 60. Also, as the partition 66 may be spaced apart from a surface of the steam cover 70, the steam within the second space 62 may flow into the third space 63 through a passage (hereinafter, referred to as a second passage) defined between the surface of the steam cover 70 and the partition 66.

Also, the first and second passages defined by the partition 66 and the guide 73 may not vertically overlap each other. As the first and second passages do not vertically overlap each other, the flow path for the steam may be longer. Thus, a heating time of the steam may increase to easily generate efficient saturated steam. Also, as the first and second passage do not vertically overlap each other, bounce up or boil over of the water, which may occur as the water is supplied, may be prevented.

A plurality of interference members 67 may be disposed in the inner space of the steam case 60. The plurality of interference members 67 may be disposed in the first space 61. The plurality of interference members 67 may allow the water within the first space 61 to interfere with the steam, thereby increasing flow time.

Also, boil over of the water supplied through the water supply 74 may be primarily prevented by the plurality of interference members 67. This is done because the water supply 74 is adjacent to the plurality of interference members 67. At least one of the plurality of interference members 67 may be disposed above the water supply 74.

The water supply 74 may be defined within a range, within which the plurality of interference members 67 is disposed, to prevent the water supplied through the water supply 74 from bouncing up. Each of the plurality of interference members 67 may include an interference portion 671 to interfere with the steam or water to prevent the steam or water from flowing upward, and a guide 672 to guide the steam or water to allow the steam or water to flow upward or downward. The interference portion 671 extends in a substantially horizontal direction in the drawings, and the guide 671 extends in a substantially vertical direction in the drawings.

As described above, the water heated in the first space 61 and the steam generated by heating the water may be guided by the guide portion 672 to flow upward, and then, may be restricted by the interference portion 671. The water and steam for which the upward flow is restricted by the interference portion 671 may be guided by the guide 672 to flow downward, thereby generating an eddy. The water and steam guided upward by the guide 672 may be restricted by an area of the interference portion 671, and the water and steam restricted in upward flow may be guided again downward by the guide 672 to generate the eddy of the water and steam between a bottom surface of the interference portion 671 and a side surface of the guide portion 672.

A time during which the water and steam stays in the first space 61 may increase, and the water and steam may be further heated by the steam heater 64. In detail, as the restriction in upward flow of the water and steam and the generation of the eddy of the water and steam occur, the time during which the water and steam remain in the first space 61 may increase. Thus, the water and the steam may be further heated before flowing upward.

The plurality of interference members 67 may be different in shape or interference area. If the plurality of interference members 67 have shapes different from each other, an upward flow distance of the water and steam may increase to increase a time during which the water and steam remain in the first space 61. Thus, the water and steam may be further heated for the time in the first space 61, to more efficiently generate and supply steam.

The plurality of interference members 67 disposed at a relatively upper side may form an upper row, and the plurality of interference members 67 disposed at a relatively lower side may form a lower row and may be horizontally disposed at distances different from each other. For example, when a distance between the plurality of interference members 67 disposed at the relatively upper side to form the upper row is defined as a first distance, the plurality of interference members 67 disposed at the relatively lower side to form the lower row may be arranged at a second distance greater than the first distance.

As described above, as the distance between the plurality of interference members 67 forming the upper row and the distance between the plurality of interference members 67 forming the lower row may be different from each other, a passage for the water and steam flowing upward may increase in length. As the passage for the steam and water increases in length, a heating time and area of the steam and water may also increase.

Although the plurality of interference members 67 are arranged in the two upper and lower rows in this embodiment, embodiments are not so limited. That is, the plurality of interference members 67 may be arranged in three rows instead of the two rows, for example. Also, one of each of the plurality of interference members in the lower row may be disposed between two of the plurality of interference members in the upper row disposed adjacent to each other.

As set forth above, the steam cover 70 may be coupled to the open surface of the steam case 60. The steam cover 70 may have a plate shape with a predetermined thickness. The steam cover 70 may be coupled to the steam case 60 to cover the open surface of the steam case 60.

A temperature sensor 71 to detect a temperature of the steam generated in the inner space of the steam case 60 may be mounted on the steam cover 70. The temperature sensor 71 may detect a temperature of the water received into the first space 61, that is, a temperature in the first space 61. For example, a thermistor may be used as the temperature sensor 71.

A sensor mount 72 to mount the temperature sensor 71 may be disposed on the steam cover 70. The sensor mount 72 may be disposed on a portion of the steam cover 70 corresponding to the first space 61 to protect the temperature sensor 71 against an external impact.

The sensor mount 72 may support the temperature sensor 71 to protect the water supply 74. That is, the sensor mount 72 may have a predetermined space in or at an outer surface of the steam cover 70. Thus, as a portion by which the temperature sensor 71 is supported and the water supply 74 may be disposed in the space, the sensor mount 72 may protect both the temperature sensor 71 and the water supply 74.

A water supply hose connected to the steam tank may be coupled to the water supply 74. With this embodiment, the water supply 74 is shown protruding in a pipe shape and connected to the water supply hose, as an example. Of course, the water supply 74 may have a hole shape instead of the pipe shape, and thus, the water supply hose may be fitted into the water supply 74.

As described above, the water supply 74 may have any shape if the water supply 74 is capable of being coupled to the water supply hose. That is, embodiments are not limited to the shape and size of the water supply 74.

Also, an overheat preventer (not shown) may be mounted on the steam case 60 or the steam cover 70. The overheat preventer may prevent the steam heater 64 from overheating. If a temperature detected by the temperature sensor 71 is above a predetermined safety temperature, the overheat preventer may cut a power supplied into the steam heater 64 to prevent the steam heater 64 from overheating. For example, a thermostat may be used as the overheat preventer.

As described above, the guide member 73 may protrude from the steam cover 70. In detail, the steam generated in the first space 61 may be guided by the bottom surface of the guide 73 while flowing upward, and then, the steam may be changed in flow direction to flow into a space between the guide 73 and the second space 62, that is, the first passage.

The steam flowing upward through the space between the guide 73 and the second space 62 may be restricted again by the partition 66, and thus, may be changed in flow direction. As the upward flow of the steam is restricted by the guide 73, the steam flowing from the second space 62 into the third space 63 may decrease in flow rate, thereby improve heating efficiency of the steam.

Also, when the steam generated in the first space 61 passes into the second space 62 by the guide 73, the passage may be converted to increase in flow distance. As a result, as the flow distance of the steam increases, a heating time of the steam may increase. In addition, the water bouncing up in the first space 61 may be secondarily blocked by the guide 73 to prevent the water from bouncing up or boiling over into the third space 63.

The water supply 74 may be defined in or at a lower portion of the steam cover 70. The water supply 74 may have the pipe shape, as described above, and may be coupled to the water supply hose to supply the water into the first space 61. When the steam cover 70 is coupled to the steam case 60, the water supply 74 may be defined in the steam cover 70 within a range of the plurality of interference members 67.

The introduction of the water into the first space 61 may be guided by the water supply 74 so that the flow distance of the water may be minimized. As the water supply 74 guides the water into the first space 61, the flow distance of the water until the water is introduced into the inner space of the steam case 60 may be minimized.

According to this embodiment, as boiling over and bouncing up of the water may be prevented by the partition 66, it may prevent the water from being discharged into the inner space of the cooking chamber 40 through the at least one discharge 65.

Figure 8:
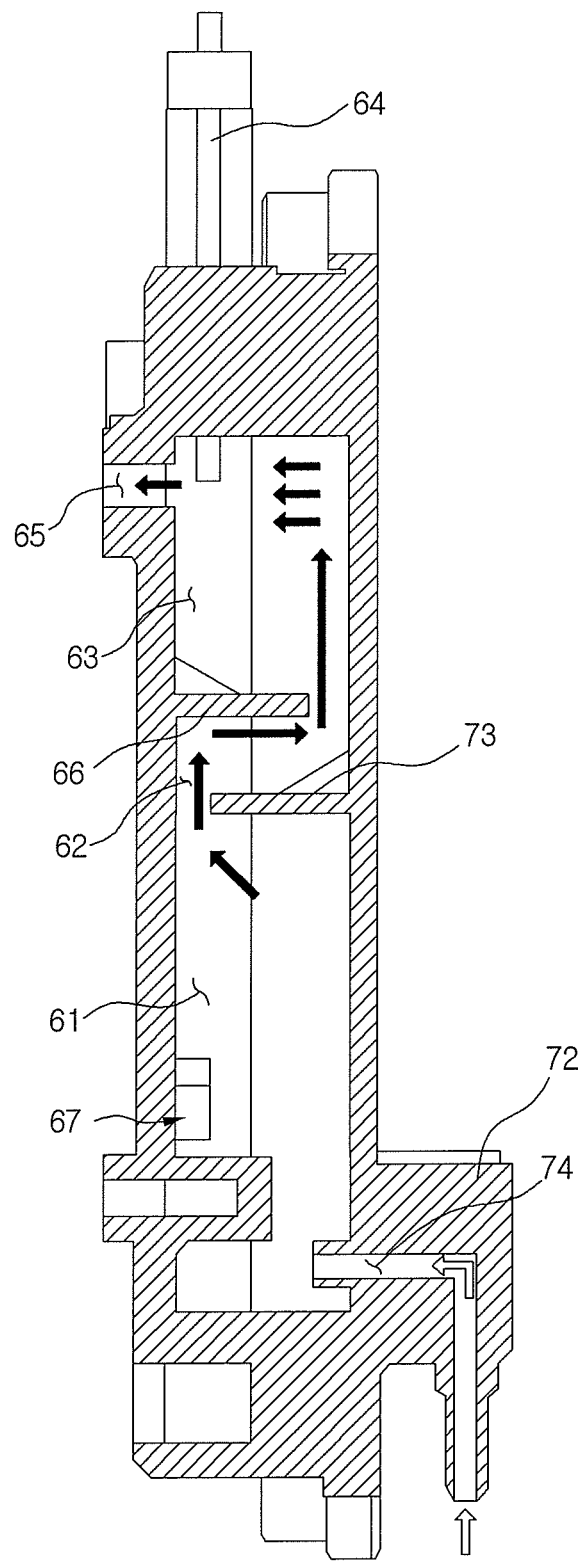
FIG. 8 is a side cross-sectional view illustrating a flow of steam in the steam generator of the cooking appliance of FIG. 1.

Hereinafter, a flow path of the steam generated in the steam generator according to this embodiment will be described with reference to FIG. 8. FIG. 8 is a side cross-sectional view illustrating a flow of steam in the steam generator of the cooking appliance of FIG. 1.

Referring to FIG. 8, when the water is supplied into the first space 61 through the water supply 74, the water may be heated by heat generated in the steam heater 64. Thus, the water may be heated in the first space 61 to generate saturated steam. Then, the saturated steam may flow upward.

Boiling over and bouncing up of the water supplied into the first space 61 may be primarily prevented by the plurality of interference members 67. Also, a contact area of the water with the steam case 60 may increase by the area of the plurality of interference members 67 to absorb more of the heat transferred from the steam heater 64.

The steam flowing upward may flow into the second space 62. The steam flowing into the second space 62 may be restricted in flow by the plurality of interference members 67 to increase a time the steam remains in the first space 61, and thus, may be continuously heated.

The steam continuously heated while flowing in the second space 62 may be restricted again in flow by the guide 73 while flowing upward to flow into a space between the guide 73 and the partition 66 through the first passage, that is, a gap between the guide member 73 and the steam case 60.

The steam flowing into the space between the guide 73 and the partition 66 may be guided by a bottom surface of the partition 66 to flow into the second passage, which is a gap between the partition 66 and the steam cover 70.

The passage may be converted by the guide 73, and then, may be converted again by the partition 66. Thus, the steam may decrease in flow rate and increase in flow distance by the conversion of the passage. As a result, the steam may be further heated to generate superheated steam, thereafter flowing into the third space 63. That is, the steam passing through the space between the guide 73 and the steam case 60 may pass through the space between the partition 66 and the steam cover 70 and then may be introduced into the third space 63.

As described above, the superheated steam may flow into the third space 63, and the steam flowing into the third space 63 may be supplied into the inner space of the cooking chamber 40 through the at least one discharge 65. Also, the steam passing through the at least one discharge 65 may increase in flow rate. Thus, the steam increasing in flow rate may be supplied into a wider range when the steam passes through the at least one discharge 65 and is supplied into the inner space of the cooking chamber 40.

Although the partition is shown disposed on the steam case, and the guide is shown disposed on the steam cover in the previous embodiment, embodiments are not limited thereto. For example, the partition may be disposed on the steam cover, and the guide may be disposed on the steam case.

Figure 3A:
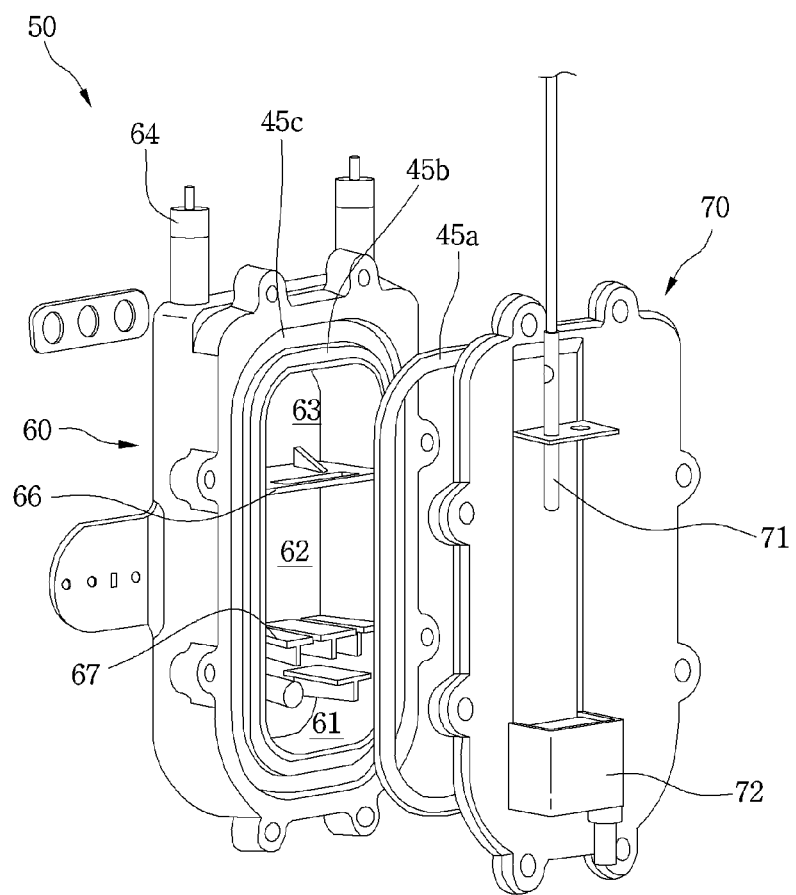
FIG. 3A is a view of a steam generator of the cooking appliance of FIG. 1 according to another embodiment.
Figure 4A:
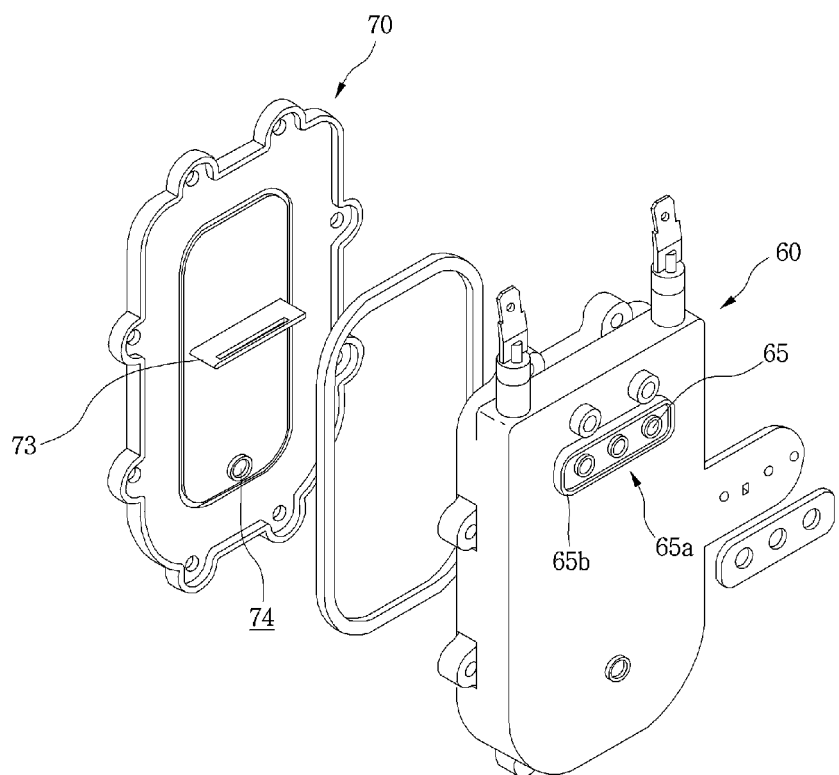
FIG. 4A is a view of a steam generator of the cooking appliance of FIG. 1 according to another embodiment.

Although the guide is spaced apart from the steam case, and the partition is spaced apart from the steam cover to define the passage for the steam in this embodiment, embodiments are not limited thereto. For example, at least one first steam hole may be defined in the guide (see FIG. 4A), and at least one second steam hole may be defined in the partition (see FIG. 3A). The at least one first steam hole and the at least one second steam hole may not vertically overlap each other.

Also, the at least one first steam hole may be defined closer or more adjacent to the at least one discharge than the water supply with respect to a horizontal direction, and the at least one second steam hole may be defined closer or more adjacent to the water supply than the at least one discharge with respect to the horizontal direction. In this case, the passage for the steam may increase in length.

Figure 9:
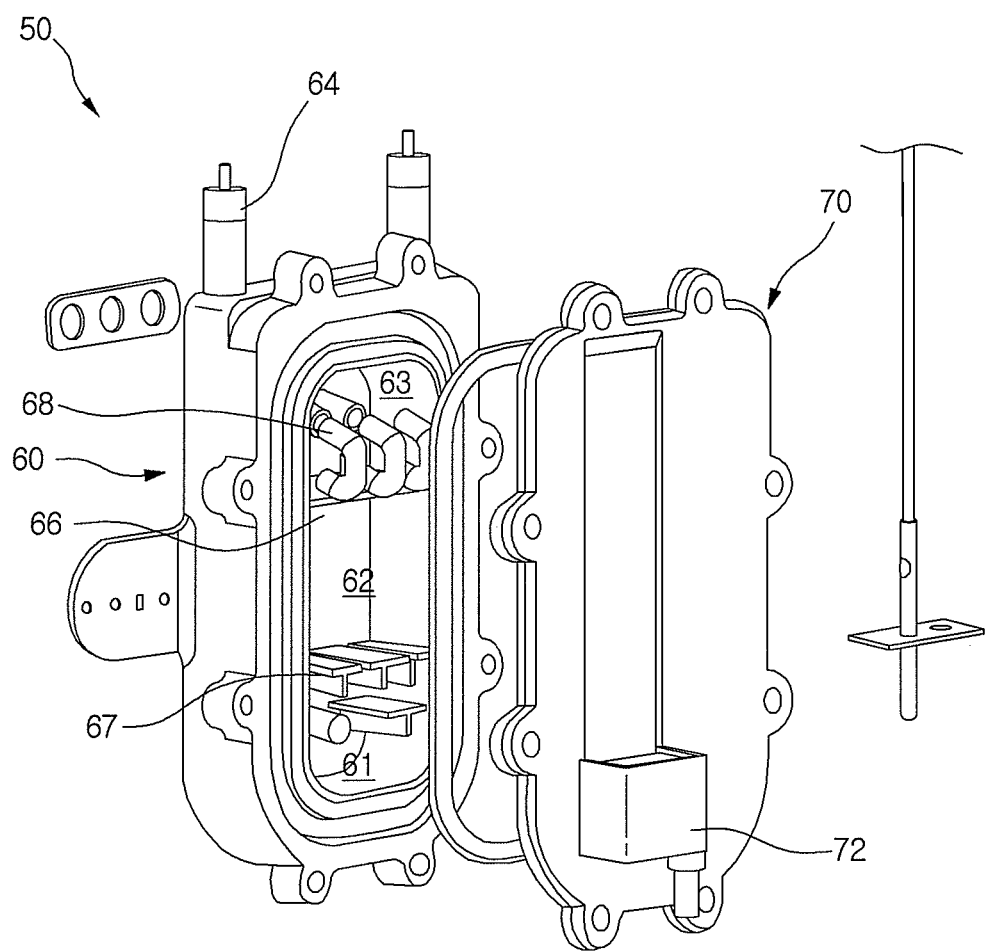
FIG. 9 is an exploded perspective view of a steam generator according to another embodiment.
Figure 10:
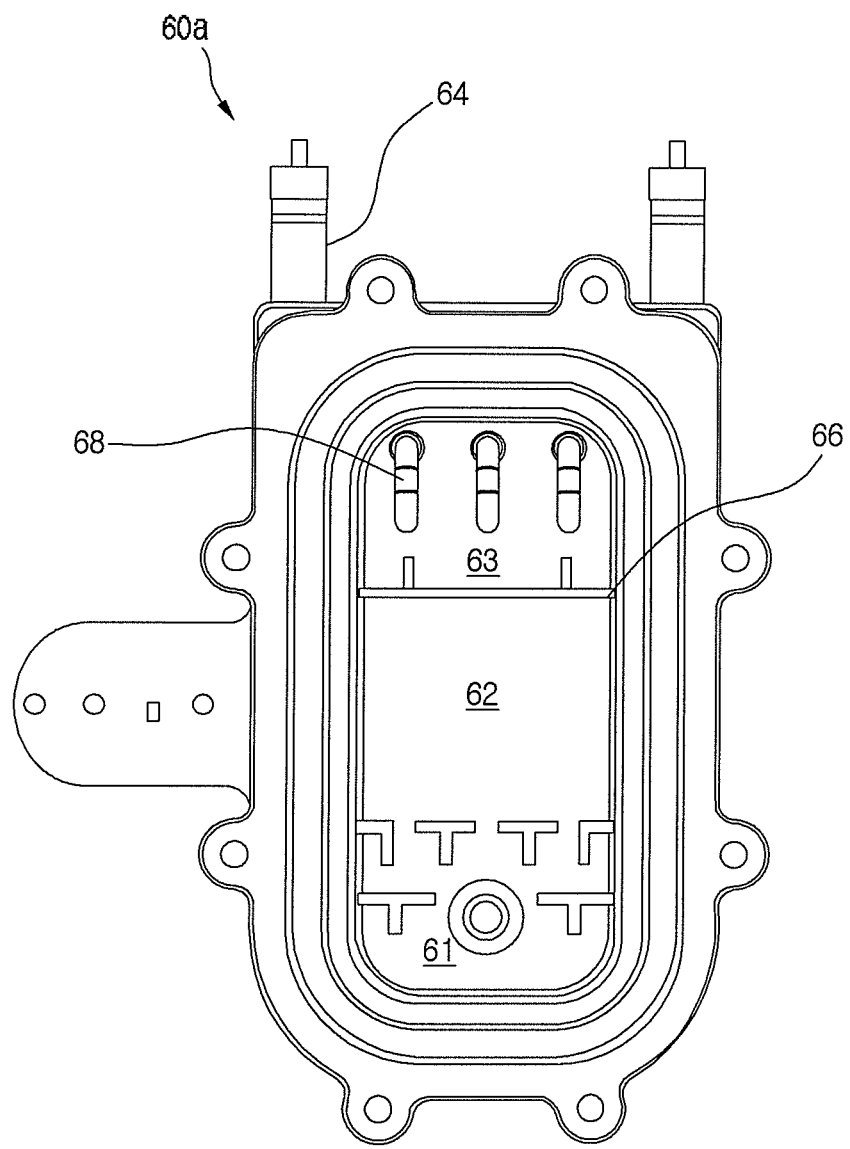
FIG. 10 is a front view of a steam case of the steam generator of FIG. 9.
Figure 11:
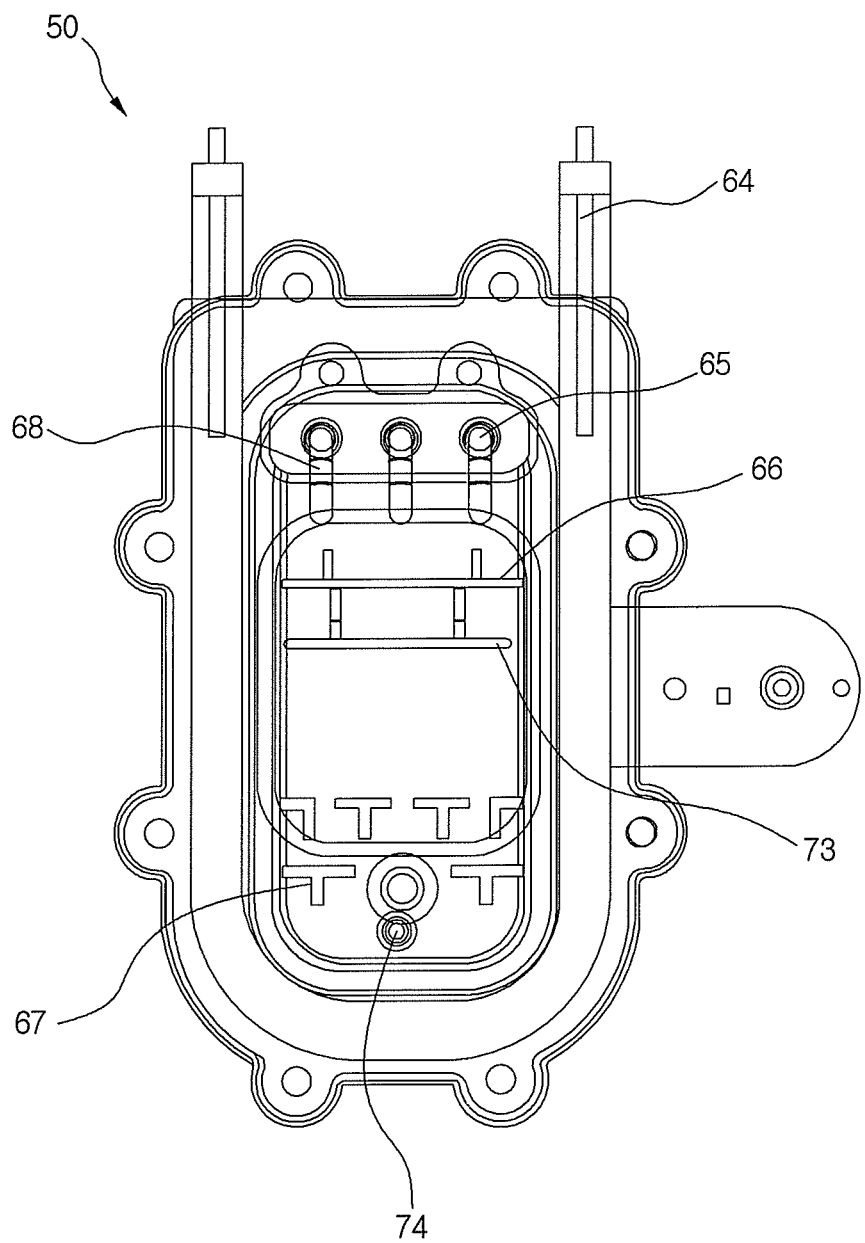
FIG. 11 is a front view of the steam generator of FIG. 9.
Figure 12:
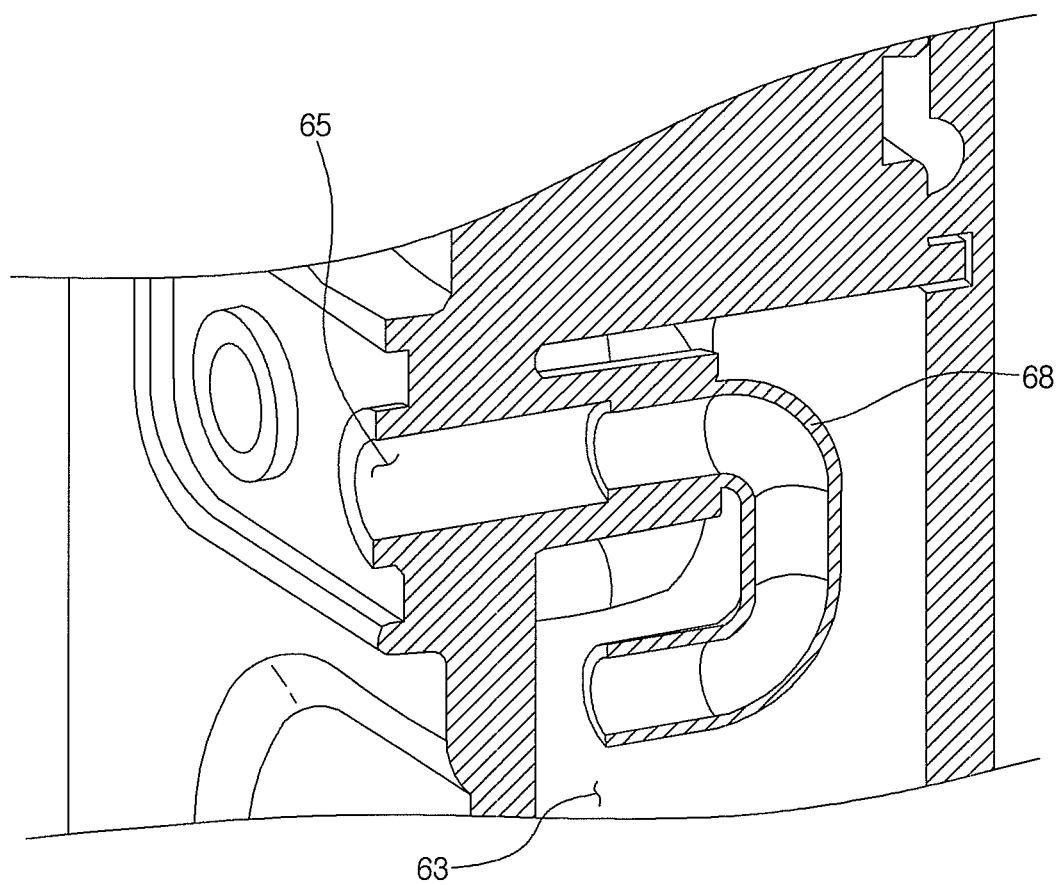
FIG. 12 is a partial cross-sectional view of the steam generator of FIG. 9.
Figure 13:
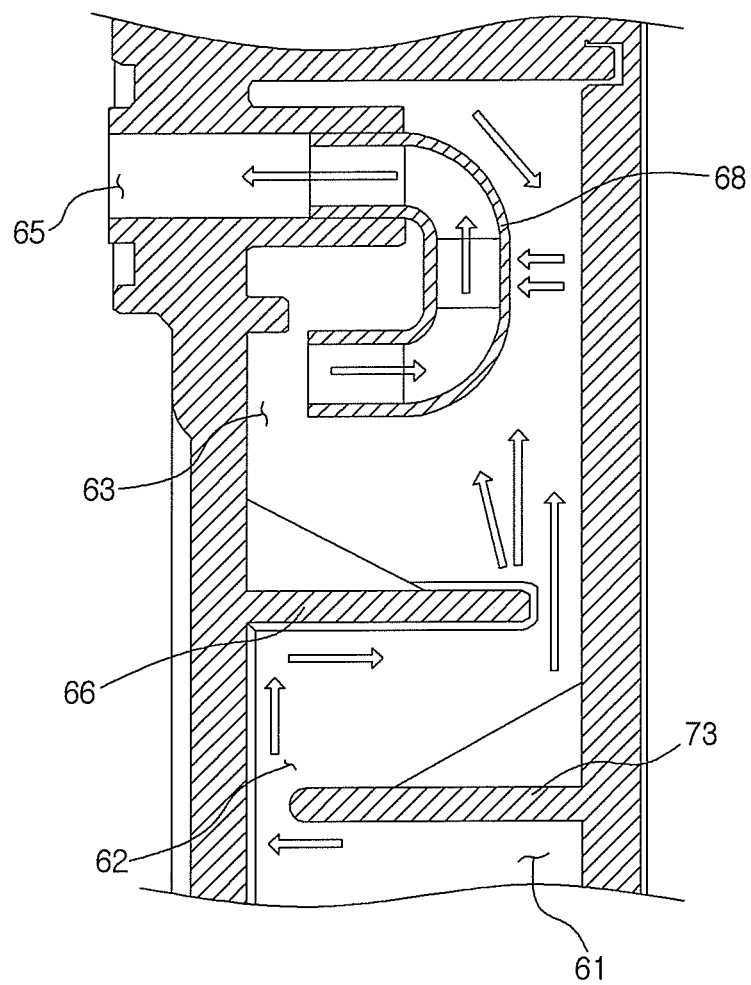
FIGS. 13 and 14 are cross-sectional views illustrating a flow of steam in the steam generator of FIG. 9.
Figure 14:
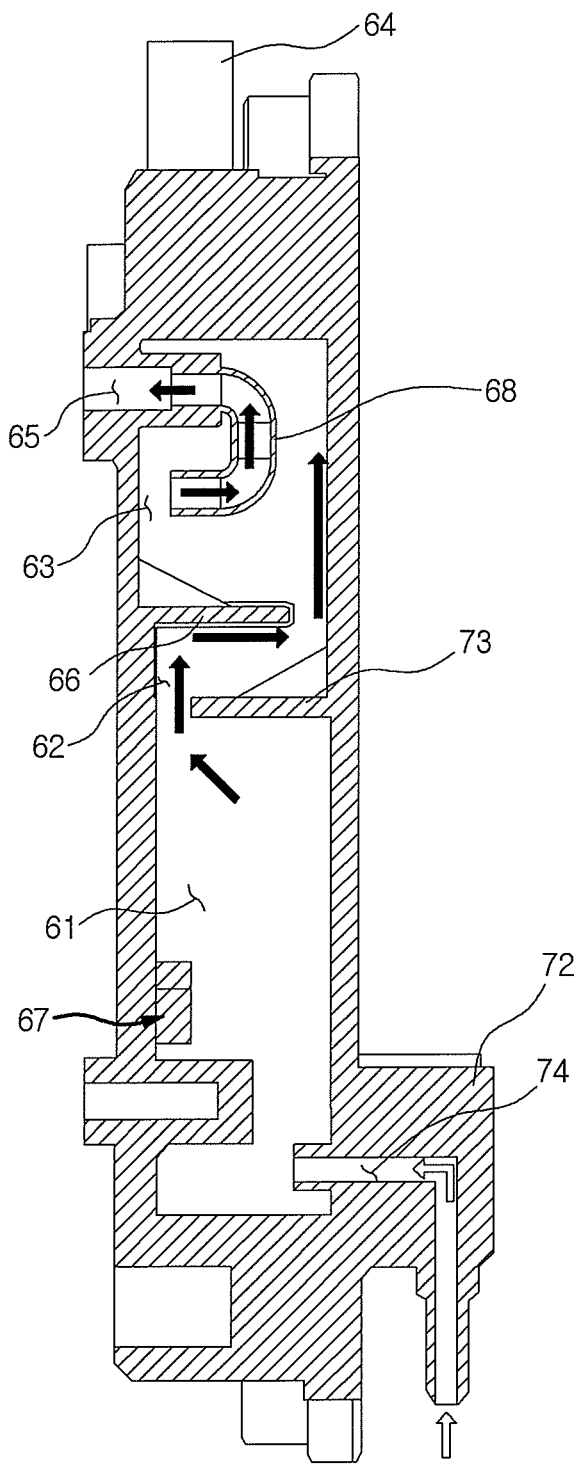

FIG. 9 is an exploded perspective view of a steam generator according to another embodiment. FIG. 10 is a front view of a steam case of the steam generator of FIG. 9. FIG. 11 is a front view of the steam generator of FIG. 9. FIG. 12 is a partial cross-sectional view of the steam generator of FIG. 9. FIGS. 13 and 14 are cross-sectional views illustrating a flow of steam in the steam generator of FIG. 9.

This embodiment is the same as the previous embodiment except that a steam guide tube is further provided. Thus, only parts specific to this embodiment will be principally described below, and repetitive descriptions of the same or similar parts as the previous embodiment have been omitted.

Referring to FIGS. 9 to 14, a steam generator 50a according to this embodiment may include steam case 60a and steam cover 70 coupled to the steam case 60a. The steam case 60a may have first to third spaces 61, 62, and 63. The steam case 60a may have at least one discharge 65 that communicates with the third space 63.

At least one steam guide tube 68 to guide the steam within the third space 65 into the at least one discharge 65 may be connected to the at least one discharge 65. The at least one steam guide tube 68 may be inserted into, for example, the at least one discharge 65. Thus, the at least one steam guide tube 68 may have a cross-sectional passage area less than a cross-sectional passage area of the at least one discharge 65.

The at least one steam guide tube 68 may be bent at least one time to change a flow direction of the steam. The at least one steam guide tube 68 may include a steam inlet and a steam outlet. The steam outlet 68 may be connected to the at least one discharge 65. Also, the steam outlet may be disposed higher than the steam inlet.

As the at least one steam guide tube 68 is connected to the at least one discharge 65, a flow distance of the steam within the third space 63 to the at least one discharge 65 may increase, and thus, a heating time of the steam in the third space 63 by steam heater 64 may increase. Thus, as the heating time of the steam by the steam heater 64 increases, the steam may change into superheated steam, and then, may be supplied into an inner space of a cooking chamber through the at least one discharge 65.

The at least one steam guide tube 68 may be formed of a metal material. For example, the at least one steam guide tube 68 may be formed of stainless or copper material; however, embodiments are not limited thereto.

Hereinafter, a flow path of the steam generated in the steam generator will be described with reference to FIGS. 13 to 14.

When the water is supplied into the first space 61 through water supply 74, the water may be heated by heat generated by the steam heater 64. Thus, the water may be heated in the first space 61 to generate saturated steam. Then, the saturated steam may flow upward.

Boiling over and bouncing up of the water supplied into the first space 61 may be primarily prevented by a plurality of interference members 67. Also, a contact area of the water with the steam case 60a may increase by an area of the plurality of interference members 67 to absorb more of the heat transferred from the steam heater 64.

The steam flowing upward may flow into the second space 62. The steam flowing into the second space 62 may be restricted in flow by the plurality of interference members 67 to increase a time the steam remains in the first space 61, and thus, may be continuously heated.

The steam continuously heated while flowing into the second space 62 may be restricted again in flow by guide 73 while flowing upward to flow into a space between the guide 73 and partition 66 through the first passage, which is a gap between the guide 73 and the steam case 60a.

The steam flowing into the space between the guide 73 and the partition 66 may be guided by a bottom surface of the partition 66 to flow into the second passage, which is a gap between the partition 66 and the steam cover 70.

The passage may be converted by the guide 73, and then, may be converted again by the partition 66. Thus, the steam may decrease in flow rate and increase in flow distance by the conversion of the passage. As a result, the steam may be further heated to generate superheated steam, thereby flowing into the third space 63. That is, the steam passing through the space between the guide member 73 and the steam case 60a may pass through the space between the partition 66 and the steam cover 70, and then, may be introduced into the third space 63.

Also, the steam introduced into the third space 63 may flow into the at least one steam guide tube 68, and then, may be discharged through the at least one discharge 65. According to this embodiment, as the steam within the third space 63 flows into the at least one steam guide tube 68 having an area less than an area of the third space 63, the steam may increase in flow rate.

Figure 15:
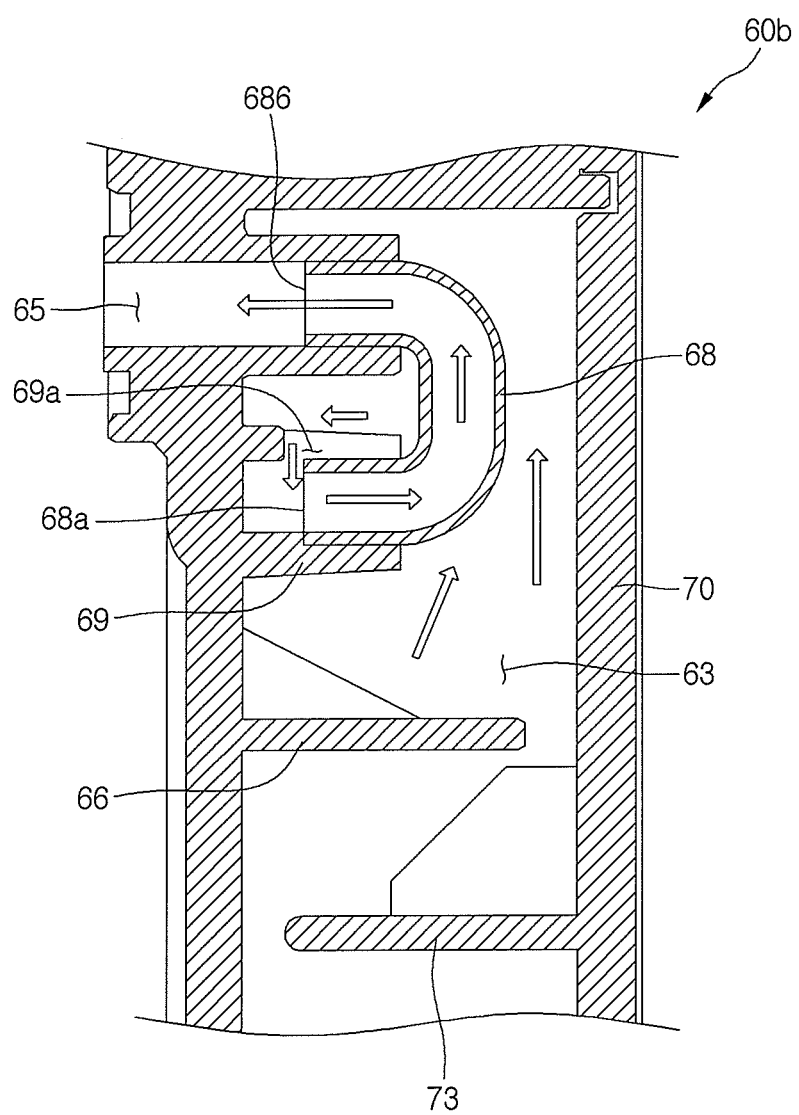
FIG. 15 is a cross-sectional view of a steam generator according to another embodiment.

FIG. 15 is a cross-sectional view of a steam generator according to another embodiment. This embodiment is the same as the previous embodiment except that a holder connected to at least one steam guide tube may be further provided. That is, a steam generator according to this embodiment may include all of the components of the steam generator according to the previous embodiment and also may further include a holder. Thus, only specific parts to this embodiment will be principally described below, and respective descriptions of the same or similar parts as the previous embodiment have been omitted.

Referring to FIG. 15, a steam case 60b according to this embodiment may further include a holder 69 connected to at least one steam guide tube 68. A steam inlet 68a of the at least one steam guide tube 68 may be connected to the holder 69, and a steam outlet 68b may be connected to at least one discharge 65.

For example, the steam inlet 68a may be inserted into the holder 69. An opening 69a may be defined in the holder 69 so that steam within third space 63 may be introduced into the steam inlet 68a. Thus, the steam within the third space 63 may be introduced into the holder 69 through the opening 69a to flow along the at least one steam guide tube 68.

According to this embodiment, as the steam within the third space 63 is introduced into the holder 69 to flow along the steam guide tube 68, the steam may increase in flow rate. Thus, a heating time of the steam by steam heater 64 may increase.

Figure 16:
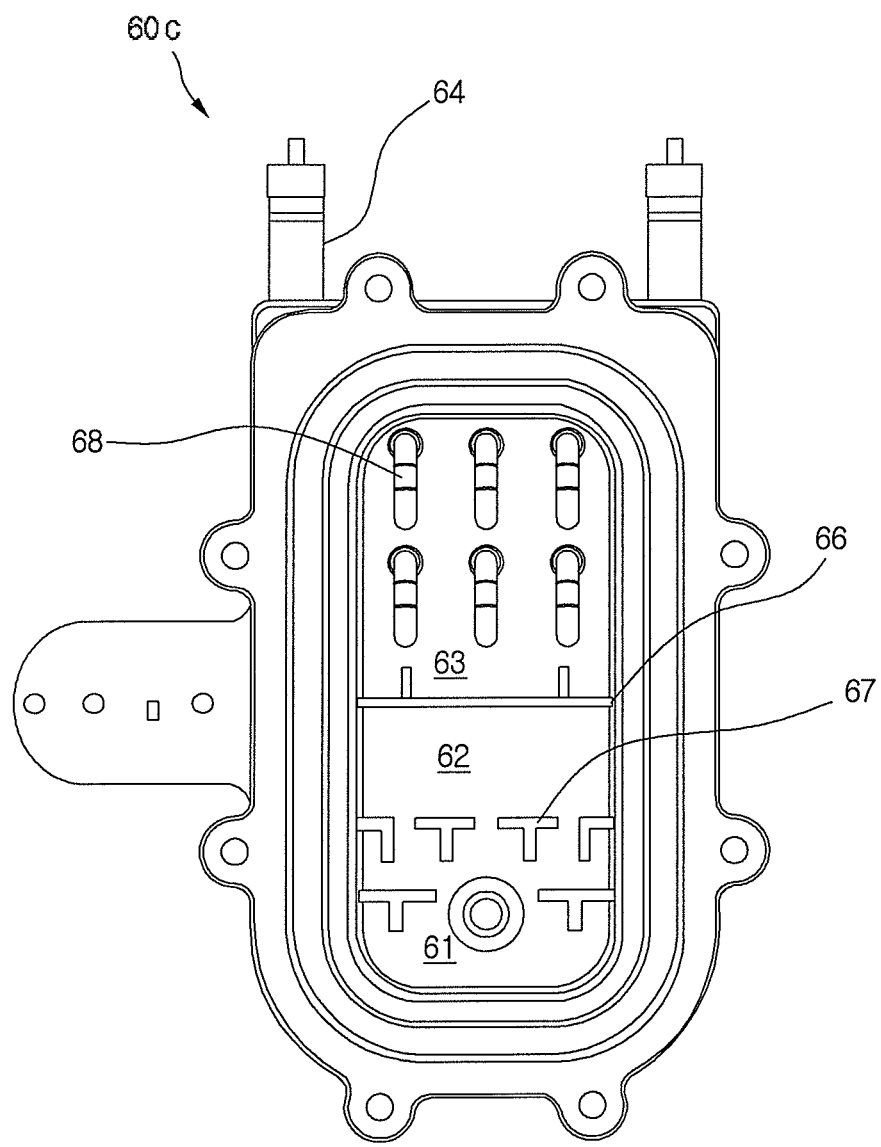
FIG. 16 is a front view of a steam case according to another embodiment.

FIG. 16 is a front view of a steam case according to another embodiment. This embodiment is the same as the previous embodiment except that a plurality of steam guide tubes are disposed to be vertically spaced apart from each other. Thus, only specific parts to this embodiment will be principally described below, and repetitive descriptions of the same or similar parts as the previous embodiment have been omitted.

Referring to FIG. 16, a plurality of steam guide tubes 68 may be disposed to be vertically spaced apart from each other in steam case 60c. Although not shown, discharges may be defined to be vertically spaced apart from each other in the steam case 60c.

Embodiments disclosed herein provide a steam generator in which boiling over of water and contamination of a cooking chamber may be prevented.

Embodiments disclosed herein also provide a cooking appliance on which a steam generator having an increased heating area to efficiently generate steam may be mounted.

Embodiments disclosed herein a steam generator that may include a steam case; a steam cover connected to the steam case; a steam chamber defined between the steam case and the steam cover; a steam heater to supply heat into the steam chamber; a water supply part or water supply through which water to generate steam may be supplied into the steam chamber; one or more interference members disposed in the steam chamber to interfere with a flow of the water introduced through the water supply part; and a discharge part or discharge to discharge the steam generated in the steam chamber. The one or more interference members may be disposed under the discharge part and above the water supply part.

Embodiments disclosed herein further provide a steam generator that may include a steam case; a steam cover connected to the steam case; a steam chamber defined between the steam case and the steam cover; a steam heater to supply heat into the steam chamber; a water supply part or water supply through which water to generate steam may be supplied into the steam chamber; a discharge part or discharge to discharge the steam generated in the steam chamber; and a steam guide tube to guide the steam within the steam chamber into the discharge part.

Embodiments disclosed herein further provide a cooking appliance that may include a cooking chamber to provide a cooking space, in which food or other items may be cooked, and a steam generator mounted on an outer surface of the cooking chamber. The steam generator may include a steam case; a steam cover connected to the steam case; a steam chamber defined between the steam case and the steam cover; a steam heater to supply heat into the steam chamber; a water supply part or water supply through which water to generate steam may be supplied into the steam chamber; and a discharge part or discharge to discharge the steam generated in the steam chamber. The steam chamber may be partitioned into a plurality of spaces, and the steam may successively flow into the plurality of spaces and be discharged to the outside through the discharge part.

The above-disclosed subject matter is to be considered illustrative, and not restrictive, and the appended claims are intended to cover all such modifications, enhancements, and other embodiments, which fall within the true spirit and scope of the present disclosure.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A steam generator, comprising:
a steam case;
a steam cover connected to the steam case;

a steam chamber defined between the steam case and the steam cover;

a steam heater to supply heat into the steam chamber;

a water supply hole, through which water to generate steam is supplied into the steam chamber;

at least one discharge hole disposed above the water supply hole, to discharge the steam generated in the steam chamber; and at least one steam guide tube to guide the steam within the steam chamber into the at least one discharge hole.

2. The steam generator according to claim 1, wherein the steam chamber comprises a plurality of spaces through which the steam flows, wherein the steam successively flows into the plurality of spaces.

3. The steam generator according to claim 2, wherein the plurality of spaces comprises:

a first space, in which the water introduced through the water supply hole is heated;

a second space defined above the first space so that the steam generated by heating the water in the first space is additionally heated therein; and a third space defined above the second space into which the steam within the second space flows, wherein the at least one steam guide tube is disposed in the third space.

4. The steam generator according to claim 1, wherein the at least one steam guide tube is bent at least one time.

5. The steam generator according to claim 1, wherein the at least one steam guide tube each comprises a steam inlet and a steam outlet that communicates with the at least one discharge hole, and wherein the steam inlet is disposed at a position lower than a position of the steam outlet.

6. The steam generator according to claim 5, further comprising a holder connected to the steam inlet of the at least one steam guide tube.

7. The steam generator according to claim 6, wherein an opening to introduce the steam within the steam chamber into the holder is defined in the holder.

8. The steam generator according to claim 7, wherein the steam within the steam chamber is introduced into the holder through the opening to flow into the at least one steam guide tube.

9. The steam generator according to claim 6, wherein the at least one discharge hole is disposed on the steam case, and wherein the holder is connected to the steam case.

10. The steam generator according to claim 1, wherein the at least one steam guide tube has a cross-sectional passage area less than a cross-sectional passage area of the at least one discharge hole.

* * * * *